Aug. 29, 1961  L. STEWART  2,997,835
MOWING ATTACHMENT FOR TRACTORS OR THE LIKE
Filed March 12, 1959  3 Sheets-Sheet 1
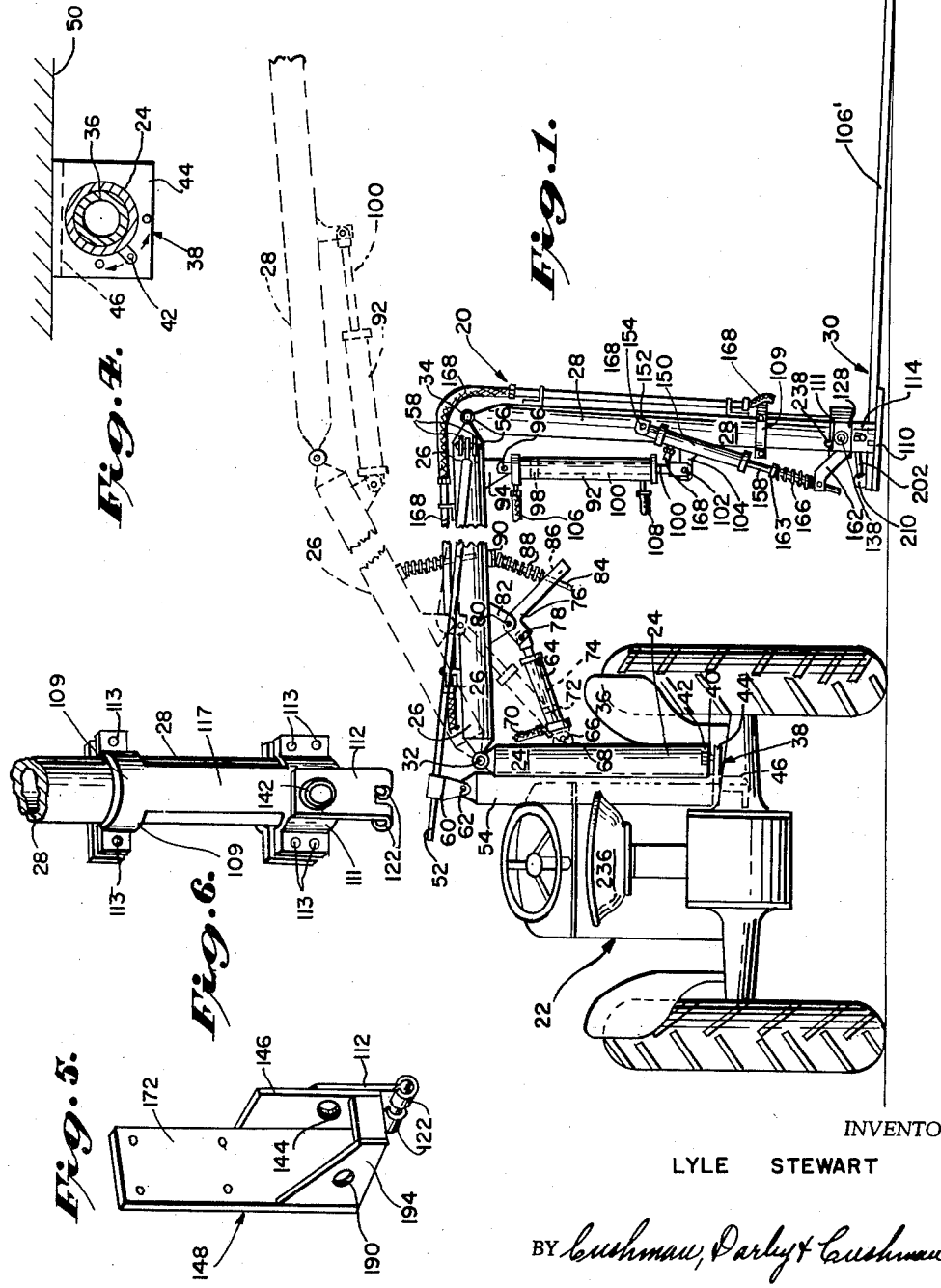
INVENTOR
LYLE STEWART
BY *Cushman, Darby & Cushman*
ATTORNEYS

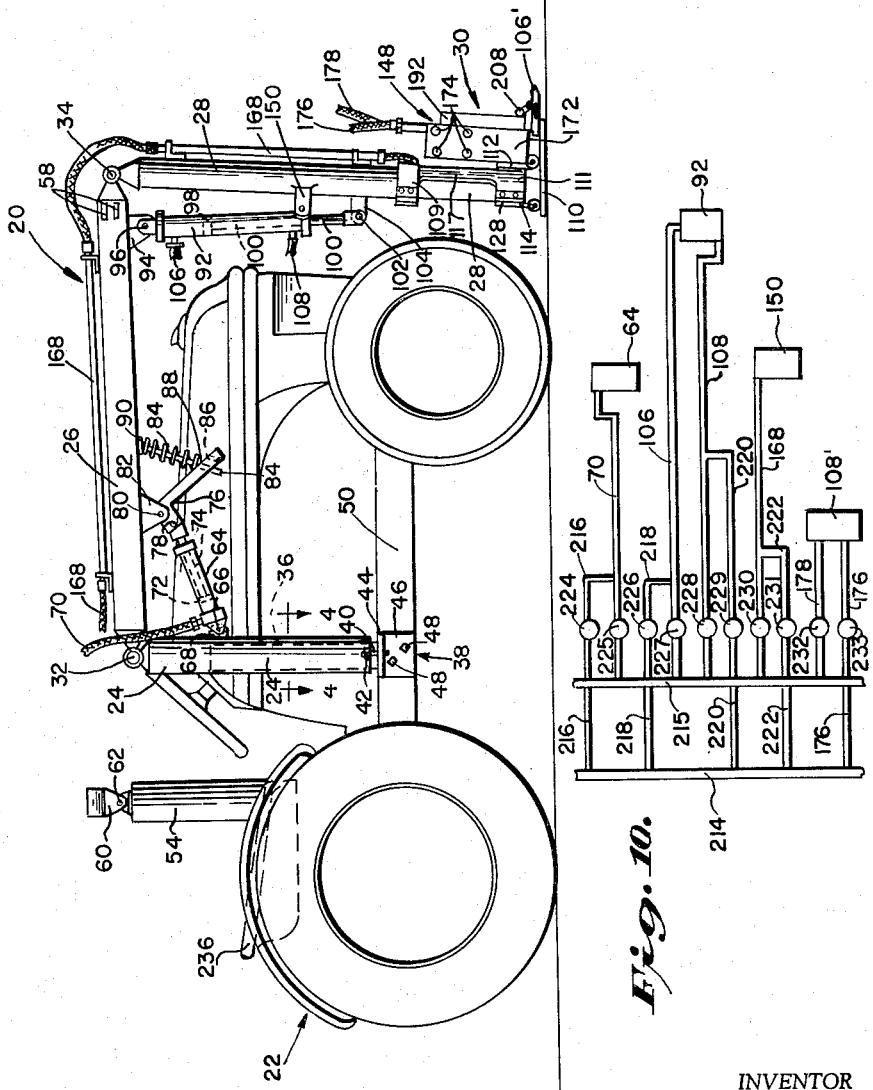

Aug. 29, 1961 L. STEWART 2,997,835
MOWING ATTACHMENT FOR TRACTORS OR THE LIKE
Filed March 12, 1959 3 Sheets-Sheet 3
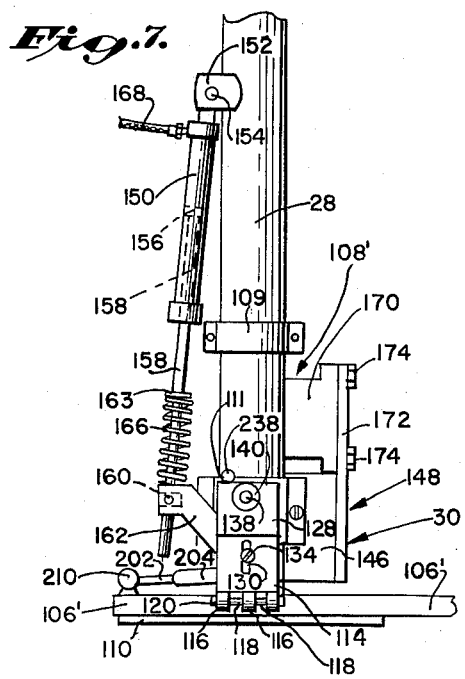
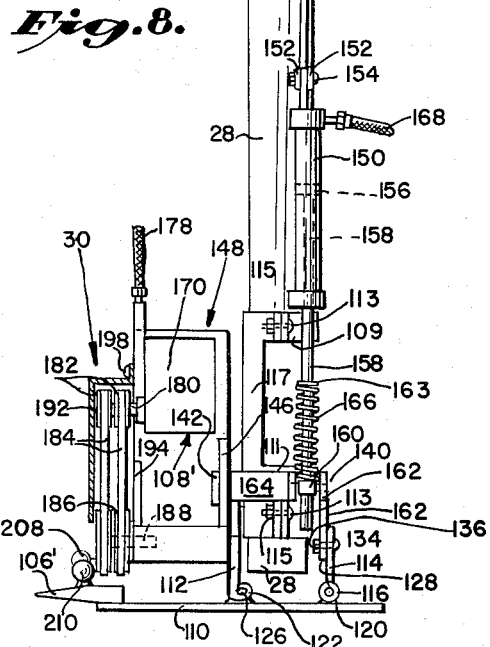
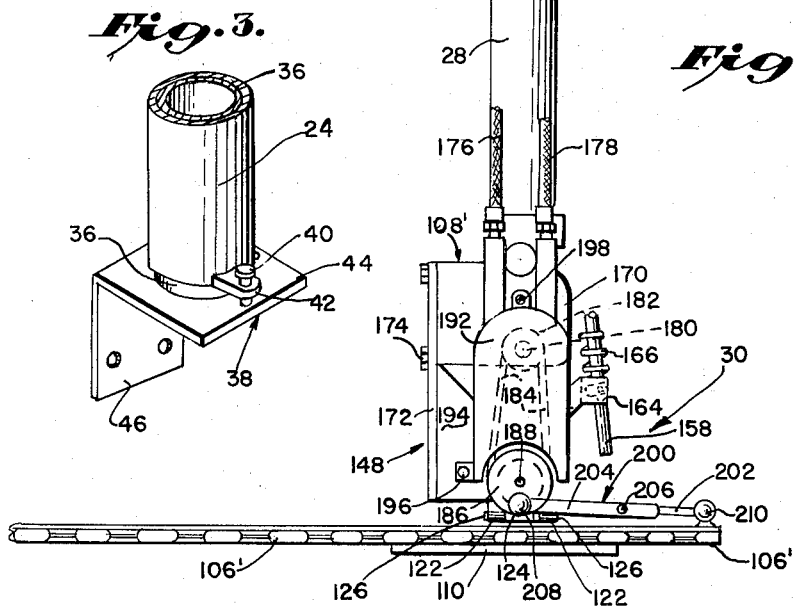
INVENTOR
LYLE STEWART
BY Cushman, Darby & Cushman
ATTORNEYS

United States Patent Office 2,997,835
Patented Aug. 29, 1961

2,997,835
MOWING ATTACHMENT FOR TRACTORS OR THE LIKE
Lyle Stewart, R.F.D. 2, Tippecanoe, Ohio
Filed Mar. 12, 1959, Ser. No. 798,970
2 Claims. (Cl. 56—25)

This invention relates to mechanical mowing equipment, and also to the combination of such equipment with a vehicle, such as a tractor.

Ambulatory mowing devices of this general character have previously been proposed. Usually such devices have the mowing attachment mounted to and extending laterally of the vehicle or tractor for mowing in a path disposed parallel to and spaced to the side of the path of movement of the vehicle. As a result, the operator finds it necessary to observe two separate paths during operation; one being the path of movement of the vehicle or tractor; and the other being the path that is mowed. Understandably, the mowing operation thus cannot be performed as expeditiously as would be possible if the mowing attachment did the cutting in front of the tractor, whereby the operator would only have to watch the direction or path immediately in front of the tractor. Furthermore, with such laterally mounted mowing attachments, it has been found to be inconvenient, if not impossible, to mow certain limited or narrow areas, or other inaccessible areas, due to the relatively large combined width of the vehicle or tractor and the mowing attachment.

Accordingly, the present invention has as one of its principal objects the provision of a novel mowing attachment and means for mounting the mowing attachment to a tractor or the like whereby the mowing attachment may be conveniently disposed in operative positions in front of the tractor as well as laterally of the tractor, as desired.

A further object is to provide a mowing attachment for vehicles, with a novel structural arrangement for mounting a cutter bar thereto whereby the position of the cutter bar may be adjusted in a plurality of different directions for different positions of use and adapting it for cutting slopes or ditches, as well as adapting it to make deeper or shallower cuts, as desired.

An additional object resides in the provision of an improved, simplified and versatile mowing attachment for vehicles, and designed to be conveniently attached to or removed from a tractor or the like.

According to the illustrative embodiment of the invention, to be described in more detail hereinbelow, there is provided an ambulatory mowing apparatus comprising a vehicle, and a mowing attachment including an upright support member, and a cutter assembly, with first means operatively connecting said cutter assembly to said support member, and a second means carried by said vehicle and supportingly engaging said upright support member, with said second means providing for adjustment of said cutter assembly between a first operative position to one side of said vehicle and a second operative position in front of said vehicle. In the illustrative embodiment, the second means referred to includes a stationary upright, telescopically engaged to said support member and in substantial coaxial relation therewith, with said support member being rotatable relative to said upright and about its own longitudinal axis.

It is further contemplated that the mowing attachment of the invention comprise a plurality of elongated members pivotally connected to one another with the cutter assembly being carried by the free end of the outer of these members, the members being of sufficient size to dispose the cutter assembly outwardly of said vehicle to provide for operative cutting positions thereof both laterally and forwardly of said vehicle, and with means being provided for selectively pivoting said members individually relative to each other and bodily relative to the vehicle whereby the elevation of the cutter assembly may be conveniently varied as desired.

The cutter assembly is connected to the outer of these members by structure providing for adjustment of said cutter assembly in a plurality of different positions and in a plurality of different directions adapting the cutter assembly to be disposed in operative position laterally or forwardly of the vehicle, as well as adapting the cutter assembly to be tilted for cutting slopes and pitched for making deeper or shallower cuts.

Further objects and advantages of the invention will be in part obvious and in part pointed out hereinafter.

The novel features of the invention may be best made clear from the following description and accompanying drawings in which:

FIGURE 1 is a rear end elevational view of a tractor and of an illustrative embodiment of a mowing attachment of the invention, mounted thereto and extending laterally therefrom, with the motor for the cutter bar being omitted for clarity of illustration, and with some other parts being broken away;

FIGURE 2 is a side elevational view of the tractor and mowing attachment of FIGURE 1, with the mowing attachment shown in an operative position in front of the tractor;

FIGURE 3 is an enlarged fragmentary perspective view of an exemplary construction for mounting the mowing attachment to the tractor;

FIGURE 4 is an enlarged sectional view taken generally along line 4—4 of FIGURE 2;

FIGURE 5 is an enlarged fragmentary perspective view of an exemplary construction for mounting the cutter bar assembly and a hydraulic motor therefor at the outer end of the mowing attachment;

FIGURE 6 is an enlarged fragmentary and perspective view of means for engaging the cutter bar assembly to the outer end of the mowing attachment;

FIGURE 7 is a fragmentary and enlarged elevational view, corresponding to FIGURE 1, and of cutter bar assembly and other structure at the outer end of the mowing attachment;

FIGURE 8 is a fragmentary elevational view of the structure shown in FIGURE 7 and taken as by looking to the right in the latter figure;

FIGURE 9 is a fragmentary elevational view of the structure shown in FIGURE 8 and taken as by looking to the right in the latter figure; and FIGURE 10 is a diagrammatic view of an exemplary hydraulic or pneumatic flow system adapted to be utilized in connection with operating the illustrated mowing attachment.

Referring now to the drawings, a mowing attachment embodying the invention is indicated generally by numeral 20 and is shown in FIGURES 1 and 2 as being attached to a tractor 22. As will be understood, the particular type of vehicle to which the mowing attachment 20 is secured is not material, it being understood that other types of vehicles may also be utilized, as desired.

As best seen in FIGURES 1 and 2, the illustrated mowing attachment comprises three pivotally interconnected members 24, 26, 28, and a cutter bar assembly 30. The structure of this assembly 30 and the manner of its connection to the member 28 will be described hereinafter.

These members 24, 26, 28 are of any suitable construction, for example, elongated metallic tubes or cylinders of sufficient thickness and strength to provide the support needed during operation. Member 24 is pivotally connected at 32 to member 26 to define a horizontal pivotal axis disposed substantially perpendicularly to the axes of the members 24, 26. A similar pivotal connection 34 is shown for connecting the members 26, 28 and also defining a horizontal pivotal axis disposed substantially perpendicularly to the axes of the members 26, 28. These pivotal connections 32, 34 are of any appropriate construction providing adequate strength and means are provided for holding these members in a fixed position or for effecting pivoting action of member 28 about the horizontal pivot connection 34 and relative to member 26, and of member 26 about the horizontal pivot connection 32 and relative to member 24. This means will be described hereinbelow.

In accordance with the invention, means are provided whereby the mowing attachment is adapted to be disposed in an operative position laterally to the side of the tractor 22, as indicated in FIGURE 1, or in an operative position forwardly of the tractor, as indicated in FIGURE 2. In the illustrative embodiment, this means comprises an upright tubular support member 36 mounted on an angulated bracket 38 fixed to the tractor, the member 36 being telescopically engaged inside of the hollow tubular member 24, as indicated in FIGURES 1, 2 and 3. Hence, the member 24 is rotatable on the upright 36 and about its own longitudinal axis. By reason of this construction, the mowing attachment 20 is adapted to be rotated bodily, as a unit, about the longitudinal axis of the members 24, 36 whereby the mowing attachment may be disposed laterally to the side of the tractor, as indicated in FIGURE 1, or forwardly in front of the tractor, as indicated in FIGURE 2. In other words, member 24 is rotatable on the upright 36 and about its own longitudinal axis so that the entire mowing attachment 20 may be swung bodily about the axis of member 24 as the latter rotates on the stationary upright 36. In this connection, it will be observed that the member 26 will be of sufficient length to assure that the member 28 and cutter bar assembly 30 will be disposed at a proper distance for mowing laterally or forwardly of the tractor, as the case may be.

It is also contemplated that suitable means be provided for retaining the mowing attachment 20 either in the lateral position shown in FIGURE 1 or in the forward position thereof shown in FIGURE 2. As shown, such means is in the form of a bolt or pin 40 extending through a hole in a projection 42 at the bottom of the member 24 and also through a hole in the horizontal portion 44 of the bracket 38. Holes will be provided in this horizontal portion 44 at appropriate locations therein for reception of the locking pin 40 when the member 24 is rotated to the two positions thereof corresponding to the lateral and forward dispositions of the mowing attachment shown.

As best seen in FIGURE 3, the vertical portion 46 of bracket 38 is apertured whereby bolts 48 (see FIGURE 2) are used to secure the bracket to an appropriate part of the tractor, such as the frame part 50, the bolts passing through portion 46 and the frame part 50 and being engaged to locking nuts or the like (not shown). The position of member 24 illustrated in FIGURE 3 will correspond to the position thereof shown in FIGURE 1.

Bracket 38 preferably is a heavy duty angle iron capable of satisfactorily supporting the upright 36 and the mowing attachment 20. Although clearance has been shown in the drawings between the bottom of the member 24 and the horizontal portion 44 of the angle iron, it will be appreciated that member 24 may rest directly on this portion 44, if desired. Or, an annular shoulder or the like (not shown) may be formed on the upright 36 adjacent and above the portion 44 for supportingly engaging the bottom of member 24 to dispose it in the position shown.

A rod 52 is shown in FIGURE 1 as being engaged to the outer end of the member 26 and also to an upright support 54, the latter shown as being suitably attached to the tractor 22 rearwardly of the upright 36. This rod 52 is shown as being releasably engaged to the member 26 by means of a bolt or pin 56 (see FIGURE 1) extending through the outer end of the rod 52 and mounted in vertically spaced lugs 58 fixed to the member 26. The opposite end of the rod 52 is shown as extending through a bushing or sleeve in a member 60 connected to the top of the support 54, as by pivot pin 62, as shown. This rod 52 thus will provide additional support for the mowing attachment 20 when the latter is in the position thereof shown in FIGURE 1. When disposing the mowing attachment 20 so that the cutter assembly 30 is in front of the tractor, as indicated in FIGURE 2, rod 52 may be released from its connection with the pin 56 and also removed from its engagement to the member 60, if desired, as by sliding the rod through this member.

The means referred to above for holding the members 24, 26, 28 in desired positions, and for effecting pivotal movements therebetween will now be described. In the illustrative embodiment, a cylinder 64 is shown pivoted by a pin 66 at its rear end to a lug 68 fixed to the member 24 in the position shown. This cylinder is fluidtight and a fluid line 70 connects into one end thereof, as indicated. A piston 72 having a rod 74 is slidably mounted in this cylinder, as indicated, with the rod 74 extending through the opposite end of the cylinder and pivotally connected at its outer end to the short arm of a bell crank lever 76 as by pivot pin 78, as indicated. This lever 76 is in turn pivoted by pin 80 to a lug 82 attached to and depending from the member 26, as shown.

A rod 84 extends from the member 26 downwardly through a slot 86 in the outer end of the longer arm of the bell crank lever 76 as shown, and a compression spring 88 is arranged around this rod 84, abutting at its opposite ends against a plate 90 provided on the inner end of the rod 84, and also against the free end of the longer arm of the lever 76, also as indicated. As is evident, the longer arm of the lever 76 will further compress the spring 88 when the lever 76 is pivoted upwardly or in a counterclockwise direction, as viewed in FIGURE 1. In the position shown in FIGURE 1, the cylinder 64, piston 72, rod 74 and lever 76 provide a rigid structure against which the spring 88 is compressed until the weight of the member 26 and associated structures is fully supported, at which time the mowing attachment will be in the position thereof shown in FIGURE 1 or 2.

The line 70 communicates with an appropriate source of fluid under pressure (not shown), such as a liquid, whereby when such fluid is introduced into the cylinder 64 the piston 72 and rod 74 will be moved toward the opposite end of the cylinder, thus causing the bell crank lever 76 to effect a pivoting of the member 26 upwardly about the pivotal axis 32, for example, to the position thereof shown in dotted lines in FIGURE 1.

When the pressure of the fluid in line 70 and in cylinder 64 is relieved, the weight of member 26 and associated structures will cause member 26 to return to its normal position, shown in full lines in FIGURES 1 and 2.

For effecting pivotal movement between the members 26, 28 a dual action cylinder 92 is provided, pivotally engaged at its upper end to a lug 94 by pin 96, the lug 94 being attached to member 26 as indicated. A piston 98 is slidably arranged in the cylinder 92 and is carried by a rod 100 extending through the bottom of the cylinder and pivotally connected at its lower end by pin 102 to a lug 104 attached to and extending inwardly from the member 28, as shown.

Fluid lines 106, 108 respectively connect into the upper and lower ends of cylinder 92 on opposite sides of the piston 98. These lines communicate with an appropriate source of fluid under pressure (not shown), such as liquid, so that when such fluid is introduced into the cylinder 92, say, through line 106, it will operate to move the piston 98 and piston rod 100 downwardly so that the member 28 will be pivoted upwardly about axis 34, such as, for example, to the position thereof indicated in dotted lines in FIGURE 1. During such movement there will be some shifting or pivoting of cylinder 92 relative to member 26, as will be evident. To return the member 28 to its original, generally vertical position, fluid under pressure will be introduced through line 108 into the cylinder 92, and the pressure in line 106 will be simultaneously relieved whereby the piston 98 and rod 100 will be retracted to swing member 28 downwardly about pivot pin 34 and to the position shown in full lines in FIGURE 1.

Thus, it will be appreciated that the cutter bar assembly 30 on member 28 may be conveniently elevated or retracted into an inoperative position, as desired, by operating the fluid actuated pistons in the cylinders 64, 92.

An exemplary fluid flow diagram for the cylinders 64, 92 and other parts to be later described is shown in FIGURE 10 and will be referred to again in more detail as the description proceeds.

Referring now to the cutter bar assembly 30, there is provided an elongated cutter bar 106' of any conventional design, for example, involving a row of stationary and a row of reciprocating cutting teeth, as is well known in the art. A fluid actuated motor 108' (see FIGURES 7, 8, 9) is shown as being drivingly connected to the row of movable cutting teeth for reciprocating the latter, as will be discussed in greater detail hereinafter, and means are provided for swivelly mounting the cutter bar assembly to the bottom of the member 28 whereby the assembly 30 may be rotated bodily, as a unit, about the longitudinal axis of the member 28. Means are also provided for effecting a tilting of the cutter bar 106' as well as a pitching thereof.

The illustrative embodiment of these means includes upper 109 and lower 111 clamps releasably and tightly connected together around member 28 as by bolts 113 and nuts 115, as best shown in FIGURE 6, with a vertical strap 117 joined thereto and extending therebetween, also as shown. Further, a base plate 110 is secured at its outer end to the cutter bar 106', and is provided with spaced hinges 112, 114 joined thereto and extending upwardly therefrom for journalling to the clamp 111 and about a common axis transverse to the longitudinal axis of member 28, as will be later described. The rear hinge 114, as best shown in FIGURE 7 includes spaced bearings 116 fitted on opposite sides of apertured lugs 118 which are suitably attached to the plate 110, with a hinge pin 120 extending through the bearings 116 and lugs 118 and defining the hinge axis. Hinge 112 is similarly engaged to plate 110 by means of the bearings 122, lug 124 and hinge pin 126, as best seen in FIGURE 9.

A plate 128 is attached to hinge plate 114 and forms a vertical extension thereof. An elongated slot 130 is formed in hinge 114 and a bolt 134 extends through this slot 130 and through the plate 128 for connection to a nut 136 whereby the hinge 114 may be adjusted vertically relative to the plate 128, as will be evident.

Plate 128 and hinge 112 are journalled to the clamp 111 at diametrically opposite points and about a common axis transverse to member 28, whereby the base 110 and hinges 112, 114 will be swingable about such axis. Any suitable structure is contemplated for this purpose. For example, as best seen in FIGURES 1 and 7, a tubular bearing 138 is suitably fixed to clamp 111 and extends through a hole in plate 128, with an annular flange 140 formed on the bearing and holding the plate 128 in position. A similar bearing 142 is fixed to the opposite side of clamp 111 and extending through the hinge 112. This bearing also extends through a hole 144 in the rear wall 146 of a casing or mount 148 for the motor 108', shown in FIGURE 5. The bearing 142 is also provided with an annular flange (not shown) engaged to the wall 146 around hole 144 to retain this wall and the hinge 112 in position. Hinge 112 is also welded or otherwise secured to the rear wall 146, as desired.

As will be evident, bearings 138, 142 are on the same axis, thus providing a common axis extending through these bearings and transverse to member 28, for bodily swinging of the cutter bar 106', base 110 and hinges 112, 114 about such axis and relative to the member 28. This axis will extend substantially along a diameter of this member between the front and rear ends of clamp 111. Means are provided for effecting this swinging movement, and, as best observed in FIGURES 1, 7, 8 and 9, such means is shown as including a cylinder 150 pivoted at its upper end to and between lugs 152 by a pivot pin 154, lugs 152 being secured to member 28, as indicated. This pin 154 preferably is constructed to be conveniently attached to or removed from lugs 152 whereby the cylinder 150 may be readily attached to or detached from its pivotal connection thereto and to lugs 152. A piston 156 is slidably arranged in the cylinder 150 and a rod 158 attached thereto extends through the bottom of the cylinder, as shown in FIGURES 7 and 8. Rod 158 loosely extends through an apertured element 160 attached to and between the outer free ends of arms 162, 164. Arm 162 is suitably secured to plate 128 of the rear hinge 114 below the axis of bearing 138, and arm 164, as viewed in FIGURE 8, extends from element 160 rearwardly then to the left, and then downwardly to connect to the hinge 112 below the axis of bearing 142.

A compression spring 166 circumscribes the rod 158, bearing against the element 160, at one end, and against a collar 163 fixed to rod 158, at the other end. The element 160 is shown as being in substantial vertical alignment with the pivot pin 154 at the upper end of cylinder 150, as best seen in FIGURE 8, and this element is mounted by horizontal trunnions journalled in the arms 162, 164, all for a purpose that will be apparent as the description proceeds.

A fluid line 168 connects into the cylinder 150 at the upper end thereof, and communicating with an appropriate source of fluid under pressure (not shown) such as liquid, whereby when such fluid is introduced thereby into cylinder 150, the piston 156 and rod 158 will be forced downwardly to compress spring 166 against element 160 causing the cutter bar 106', base plate 110, hinges 112, 114 and motor mount 148 to pivot about the common axis for bearings 138, 142, and in a clockwise direction, as viewed in FIGURE 9. Thus, the cutter bar may be tilted into a plurality of cutting positions. When the fluid pressure in line 168 and cylinder 150 is relieved, the weight of the cutter bar assembly 30 will operate to pivot said assembly about the bearings 138, 142 counterclockwise, as viewed in FIGURE 9, causing spring 166 to be compressed against the collar 163, thus returning the piston 156 and rod 158 to their normal positions, as indicated in FIGURES 7-9, wherein the cutter bar 106' is in horizontal position. Suitable stop means (not shown), such as a shoulder or detent inside the cylinder 150 are provided for limiting this upward return movement of piston 156 to dispose cutter bar 106' in the horizontal position shown. It should be evident that this pivoting movement of the cutter bar about the common axis of bearings 138, 142 will be accompanied by some shifting of cylinder 150 about its pivotal connection at 154. Furthermore, it will be appreciated that should the cutter bar 106' strike an obstacle such as a rock, during the mowing operation, this bar will be free to tilt upwardly about the axis of bearings 138, 142 (clockwise as viewed in FIGURE 9), and to return to its normal position after the obstacle has been passed.

In the illustrative embodiment of the invention, it is contemplated that the cylinder 150 and rod 158 be removed from their connections with lugs 152 and element 160, respectively, when the cutter bar assembly 30 is arranged in front of the vehicle, as shown in FIGURE 2.

In the illustrative embodiment of the invention, the motor 108' is a hydraulic motor of any conventional construction, and as best seen in FIGURES 7, 8 and 9, this motor includes a casing 170 shown as being mounted against the vertical side wall 172 of the motor mount 148, as by bolts 174. Fluid inlet 176 and outlet 178 lines connect into the motor 108', as indicated, and an output shaft 180 extends outwardly from the motor casing 170 and is shown as being drivingly connected to a pair of pulleys 182 (see FIGURE 8). Belts 184 are trained around these drive pulleys 182 and also around pulleys 186 disposed therebelow, as best seen in FIGURE 8. A shaft 188 is fixed to these latter pulleys and is journalled by any appropriate structure in the hole 190 of the motor mount 148 (see FIGURES 5 and 8). A housing 192 is provided for enclosing the upper pulleys 182 and the belts 184, and is secured to the motor casing 170 and the front wall 194 of the motor mount, as by bolts 196, 198.

The row of reciprocating teeth in the cutter bar 106' is drivingly connected to receive power from the pulleys 186. As shown, the means provided for reciprocating these teeth includes a connecting arm 200, shown as being connected at its opposite ends to the pulley 186 and to the right hand end of the row of movable cutting teeth, as viewed in FIGURE 9. This connecting arm is shown as including inner 202 and outer 204 telescopically adjustable members with a set screw 206 arranged in the outer member 204 for releasably retaining these members in any desired adjusted position as will be understood. It is contemplated that universal joints 208, 210 be provided respectively at each end of this connecting arm 200. These joints are of any conventional design, such as the ball and socket type. Joint 208 connects to the pulley 186 and joint 210 connects to the row of movable cutting teeth, as is evident.

Thus, should it be desired to vary the pitch of the cutter bar 106', to make a shallower or deeper cut, the bolt 134 connecting the hinge 114 to the plate 128 will be loosened, as well as the set screw 206, and the base plate 110 may then be rocked up or down about the axis of the hinge pin 126 until the desired position is reached, at which time the bolt 134 and set screw 206 will again be tightened to hold the parts in such adjusted position. In this regard, it will be apparent that the slot 130 in the hinge plate 114 will permit the ends of the base plate 110 to be rocked up or down about the axis of the stationary hinge pin 126; while the arrangement of the telescoping members 202, 204 for the connecting arm 200, and the universal joints 208, 210 connecting this arm to the pulley 186 and to the cutter bar 106 will permit these rocking movements of the ends of the base plate 110 to take place without disturbing the driving connection between the motor 108' and the cutter bar 106', as should be evident.

Although not shown, a conventional wear plate may be arranged on the bottom of the base plate 110 to engage the ground during mowing operations.

The fluid inlet 176 and outlet 178 lines for the hydraulic motor will connect to an appropriate source of fluid under pressure (not shown), as will be referred to again hereinafter in connection with the description of the exemplary flow diagram shown in FIGURE 10.

It should be appreciated that the motor mount 148 and motor 108' will be stationary during these rocking movements of the base plate 110 about the hinge pin 126, on account of the connection of bearing 142 to the hinge plate 112 and rear wall 146 of the mount 148, as indicated in FIGURES 5 and 6.

When transferring the mowing attachment 20 from the position thereof shown in FIGURE 1 to that shown in FIGURE 2, the bolts 113 and nuts 115 on the clamps 109, 111 will be loosened, and the cylinder 150 and rod 158 released from their connections to the lugs 152 and element 160, and the cutter bar assembly 30 will then be rotated bodily, as a unit, about the longitudinal axis of the member 28 so that the cutter bar 106' will be disposed substantially in a position perpendicular to the longitudinal axis of the tractor 22 when the member 28 is disposed at the front of the tractor, as shown in FIGURE 2. At this time, the bolts 113 and nuts 115 will again be tightened sufficiently to retain the cutter assembly 30 in this position during subsequent mowing operations. When it is desired to return the mowing attachment to the position thereof shown in FIGURE 1, the bolts 113 and nuts 115 will again be loosened and the cutter bar assembly 30 rotated about the longitudinal axis of member 28 until the cutter bar 106' is disposed in a position perpendicular to the longitudinal axis of the tractor 22, when the member 28 is in the position thereof shown in FIGURE 1. In this position, the cylinder 150 and rod 158 may again be attached respectively to the lugs 152 and nut 160, as indicated in FIGURES 7 and 8.

Referring now to the exemplary flow diagram shown in FIGURE 10, numeral 214 designates a line leading from an appropriate source of hydraulic fluid pressure (not shown) while numeral 215 designates a line returning to this source. Lines 216, 218, 220, 222 and 176 branch off pressure line 214, as shown, while lines 70, 106, 108, 168 and 178 connect into the return line 215, as shown. Conventional valve structures are shown in each of these lines except for lines 214, 215, numerals 224 through 233 designating these valves, as indicated. Line 216 opens into line 70, line 218 into line 106, line 220 into 108, and line 222 into line 168, as shown.

It will be appreciated that a pump (not shown) may be provided in the line 214, upstream from the lines connected thereto, and suitably connected, for example, to a power take-off attachment on the tractor 22 for developing the proper pressure within the line 214. Suitable controls for selectively operating the valves 224–233 will also be provided. These controls preferably may be positioned adjacent to the operator's seat 236 in the tractor.

*Operation*

In operating the mowing attachment of the invention, it will be appreciated that with the parts assembled in the position thereof shown in FIGURE 1, a path may be mowed laterally of the tractor. If it is desired to change the tilt of the cutter bar 106', the valve 231 will be opened, and the valve 230 closed whereby fluid under pressure will flow from the pressure line 214 through lines 222 and 168 into the cylinder 150 to force the piston 156 and rod 158 downwardly, thus tilting the cutter bar 106 upwardly, or counter clockwise, as viewed in FIGURE 1, about the axis of bearings 138, 142, as previously explained. To return the cutter to its normal position, valve 230 will be opened and valve 231 closed whereby the cutter bar 106' will be returned by its weight to its normal horizontal position, forcing the fluid from cylinder 150 through line 168 and back into line 215, also as previously explained.

If it is desired to change the pitch of the cutter bar 106', the bolt 134 and the set screw 206 will be loosened, with the base plate 110 being rocked in the appropriate direction about the axis of hinge pin 126 until the desired pitch of bar 106' is reached, after which the bolt 134 and set screw 206 will again be tightened to retain the parts in this position, also as described heretofore.

And, if it is desired to elevate the entire cutter bar assembly 30, the valves 224, 226, 228 will be opened and the valves 225, 227, 229 closed whereby fluid under pressure will enter the cylinders 64, 92 from line 214 through the lines 216, 70, 218, 106, to drive the pistons 72, 98 so that the piston rods 74, 100 will be extended, thus pivoting the member 28 upwardly relative to the member 26, and the member 26 upwardly relatively to the member 24, such as to the positions thereof shown in dotted lines in FIGURE 1. To return these members to the position thereof shown in full lines in FIGURE 1, the valves 225, 227, 229 will be opened and the valves 224, 226, 228 will be closed, whereby the fluid will discharge from the cylinders 64, 92 through the lines 70, 106 and into the return line 215, while fluid will enter the bottom of cylinder 92 through the line 108 from lines 214 and 220.

Opening the valves 232, 233 in lines 178, 176 respectively will effect a circulation of fluid under pressure from the pressure line 214 through the line 176, motor 108' and back to the return line 215 through the line 215, as will be evident, to operate the motor.

To transfer the mowing attachment 20 so that the cutter bar assembly 30 will be disposed in a position in the front of or forwardly of the tractor, as shown in FIGURE 2, the rod 52 will be disconnected from the lugs 28, and the pin 40 will be removed from the horizontal portion 44 of the bracket 38 so that the mowing attachment may be swung bodily about the longitudinal axis of member 24 until the member 28 is in front of the tractor, as shown in FIGURE 2, at which time the pin 40 will then be inserted into a different locking hole in the portion 44 of the bracket 38, as previously described. The cylinder 150 and piston rod 158 will be disconnected from the lugs 152 and the element 160 during this swinging movement, and the clamps 109, 111 will be loosened so that the cutter bar assembly 30 may be rotated bodily about the longitudinal axis of member 28 until the cutter bar 106' is in a position perpendicular to the longitudinal axis of the tractor, as shown in FIGURE 2. The clamps 109, 111 will then again be tightened against the member 28 to hold the cutter bar assembly in this position.

A stop or detent 238 is shown in FIGURE 7 as being provided on the rear of clamp 111 for engagement to the top of the plate 128, to the left of the bearing 138, as this stop will prevent the cutter bar 106' from tilting downwardly from its horizontal position (that is, pivoting clockwise as viewed in FIGURE 1), but will not interfere with upward tilting thereof (that is, pivoting counterclockwise as viewed in FIGURE 1).

As should be evident from the foregoing, the arrangement of the springs 88, 166 will provide for a floating action of the mowing attachment 20 during use. For example, referring to FIGURE 1, spring 88 will permit some upward or downward movement of members 26, 28 relative to the stationary member 24, even though cylinder 64 is not actuated; while spring 166 will permit some upward or downward movement of the cutter bar 106' about the axis of bearing 138, 140, as indicated above.

It will thus be seen that there has been provided by this invention structure in which the various objects hereinabove set forth, together with many practical advantages, are successfully achieved. As various possible changes and modifications may be made of the mechanical features of the above invention such as those already mentioned, all without departing from the scope thereof, it is to be understood that all matter hereinbefore set forth or shown in the accompanying drawings is to be interpreted as illustrative, and not in a limiting sense.

I claim:

1. In combination: a tractor; a mowing attachment for said tractor; and means for mounting said mowing attachment to said tractor, said means including a first vertical elongated tubular member fixedly attached at its lower end to said tractor at a location on one side of said tractor, said member having a free upper end; said mowing attachment including an inner elongated vertical tubular member telescopically engaged to said first member in concentric relation thereto and for rotation relative to said first member and about the longitudinal vertical axis of said first member; releasable locking structure including means operatively connected to said inner member for releasably locking said inner member in a plurality of angular positions relative to said first member; said mowing attachment further including: an intermediate, normally horizontally extending elongated member connected at its inner end to the upper end of said inner member; an outer, normally vertically extending elongated member connected at its upper end to the outer end of said intermediate member and extending downwardly therefrom to approximately ground level; a cutter bar assembly; and means adjustably securing said assembly to said outer member for rotation of said assembly relative to said outer member and about the vertical, longitudinal axis of said outer member; and said intermediate member being of a greater length than the distance from said location to the front of the tractor whereby said outer member and said cutter bar assembly may be disposed either (1) laterally to the side of the tractor between the front and rear ends of the tractor or (2) forwardly of the front end of the tractor.

2. The combination defined in claim 1 wherein said inner member is approximately the same length as said first member and is disposed substantially coextensively therewith, and further wherein said inner, intermediate, and outer members are connected together to define horizontal pivot connections, and means being provided to move said intermediate and outer members about such pivot connections and relative to said inner member and each other.

References Cited in the file of this patent
UNITED STATES PATENTS

| | | |
|---|---|---|
| 1,897,543 | Albrecht | Feb. 14, 1933 |
| 1,911,516 | Landing | May 30, 1933 |
| 1,953,394 | Clapper | Apr. 3, 1934 |
| 2,457,693 | Leicy | Dec. 28, 1948 |
| 2,588,004 | Holmes | Mar. 4, 1952 |
| 2,815,048 | Davis | Dec. 3, 1957 |
| 2,832,183 | Pittman | Apr. 29, 1958 |